March 15, 1960

M. H. TUFT 2,928,227

RAKE TOOTH MOUNTING ASSEMBLY

Filed June 20, 1958

M. H. TUFT
INVENTOR.

BY E. C. McRAE
J. R. FAULKNER
P. F. HILDER

ATTORNEYS

March 15, 1960 M. H. TUFT 2,928,227
RAKE TOOTH MOUNTING ASSEMBLY
Filed June 20, 1958 2 Sheets-Sheet 2
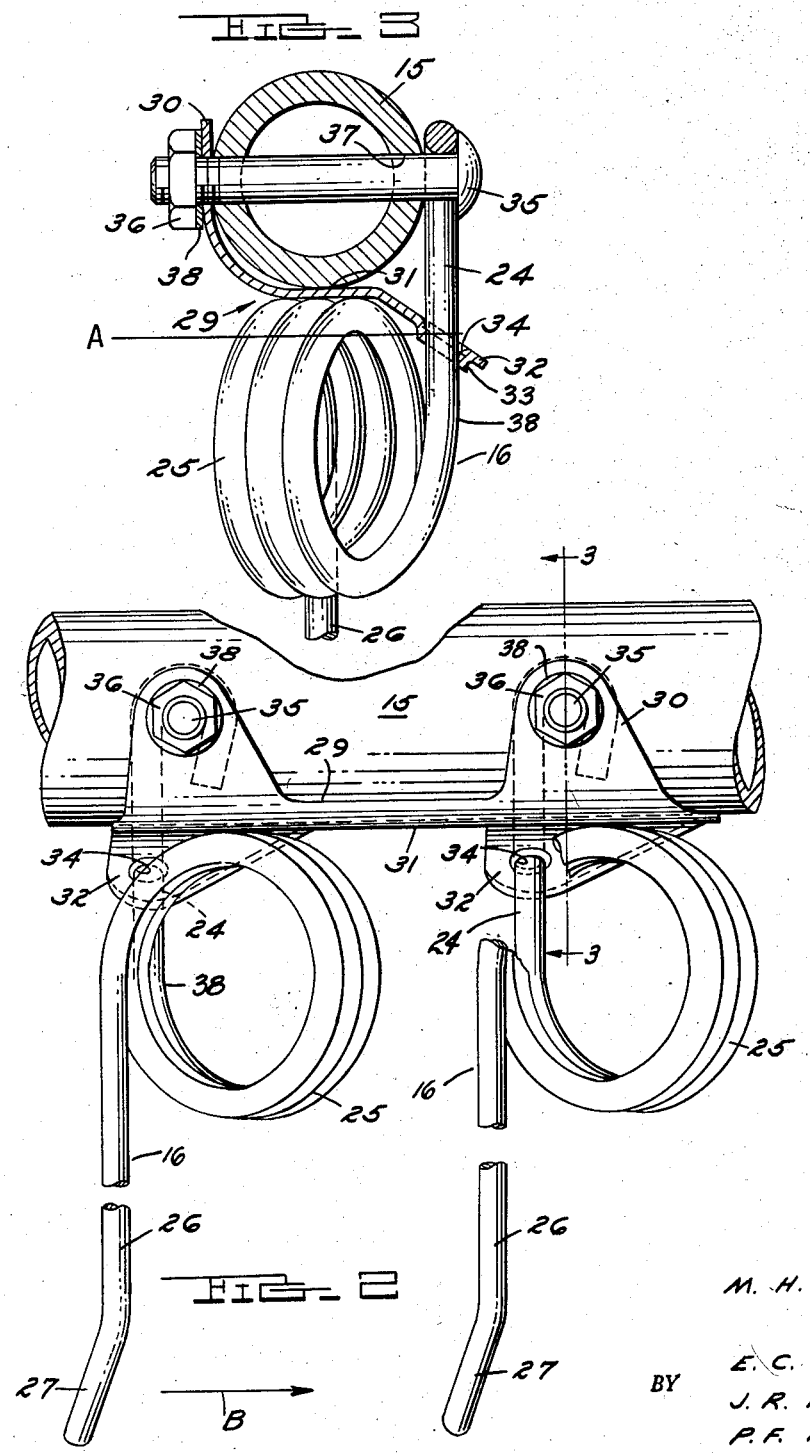
M. H. TUFT
INVENTOR.
E. C. McRAE
J. R. FAULKNER
P. F. HILDER
BY ATTORNEYS

United States Patent Office 2,928,227
Patented Mar. 15, 1960

2,928,227
RAKE TOOTH MOUNTING ASSEMBLY

Miles H. Tuft, Birmingham, Mich., assignor to Ford Motor Company, Dearborn, Mich., a corporation of Delaware Application June 20, 1958, Serial No. 743,230

7 Claims. (Cl. 56—400)

This invention relates to side delivery rakes, and more particularly to tooth bar assemblies for such rakes.

Side delivery rakes frequently are formed of a cylindrical raking reel which is oblique to the line of travel of the rake and comprises several horizontally extending tooth bars supported by discs or plates at the ends of the reel. Spring teeth or tines secured at intervals to the tooth bars engage the hay or other crop and sweep it to one side as the rake progresses across the field. The reel plates lie in parallel planes, but preferably the axes of the plates are at an angle to the axis of the raking reel. A rake of this general type is shown in Erickson et al. U.S. Patent 2,719,401, the construction of the present invention being in certain respects an improvement over the construction there shown.

The raking teeth of such rakes usually are formed of a length of springy wire having an upper portion adapted to be clamped to the tooth bar, an intermediate coil section consisting of several circular coils of the wire and a downwardly extending tine portion. The coil section is usually located immediately below the tooth bar, and the turns of the coil are generally parallel to the direction of movement of the raking tooth during its raking action when it is at the bottom of its orbit. During raking, the downwardly extending tine portion is deflected by the crop and sometimes by striking the ground, tending to tighten the coils and deflecting the coil section upwardly against the underside of the tooth bar. Even though the teeth are stress-relieved after forming, there is a tendency of teeth to become broken due to fatigue of the metal after a period of use. Upon breaking, the teeth become lost in the field and may be picked up by hay balers or other implements, particularly if the break occurs above the coiled section. It has been found that if the break occurs below the coiled section, the relatively straight tine portion is not apt to be struck or picked up by other farm machinery. In addition, the top of the coiled section of the tooth tends to wear grooves in the underside of the tooth bar, thus weakening the bar and making it subject to bending and breakage.

In the tooth bar assembly of the present invention, each tooth is bolted to the tooth bar and additionally is stabilized by a bracket embracing and supporting the tooth at about the level of the inside of the top of the coiled section. Supporting the tooth at this point not only stabilizes the tooth but also aids in preventing fatigue fracture of the tooth above the coiled section. The tooth is not apt to fracture within the coiled section, and thus not only is tooth life increased but also tooth breakage will almost invariably be at about the point of tangency between the coiled section and the downwardly extending tine portion. In addition, the bracket is interposed between the tooth bar and the coiled section so as to receive the wear caused by the coiled section and protect the underside of the tooth bar.

Among the objects of the present invention are to provide a rake tooth bar assembly in which the teeth are longer lived, in which breakage of teeth usually will occur below the coiled section, to provide such as assembly in which the teeth may be replaced individually and rapidly and which are firmly supported from the tooth bar, to provide such as assembly in which the tooth bar is protected from wear due to the coiled section of the teeth, and generally to improve tooth bar assemblies of the type described.

Other objects and objects relating to details of manufacture and assembly will be apparent from the detailed description to follow:

My invention is clearly defined in the appended claims. In the claims, as well as in the description, parts may at times be identified by specific names for clarity and convenience, but such nomenclature is to be understood as having the broadest meaning consistent with the context with the concept of my invention as distinguished from the pertinent prior art. The best form in which I have contemplated applying my invention is illustrated in the accompanying drawings forming part of this specification in which:

Figure 2 is an enlarged rear elevation of a section of a tooth bar assembly including two teeth, portions of the assembly being broken away for convenience of illustration.

Figure 3 is a vertical section of the tooth bar assembly, taken generally along the line 3—3 of Figure 2.

Figure 1:
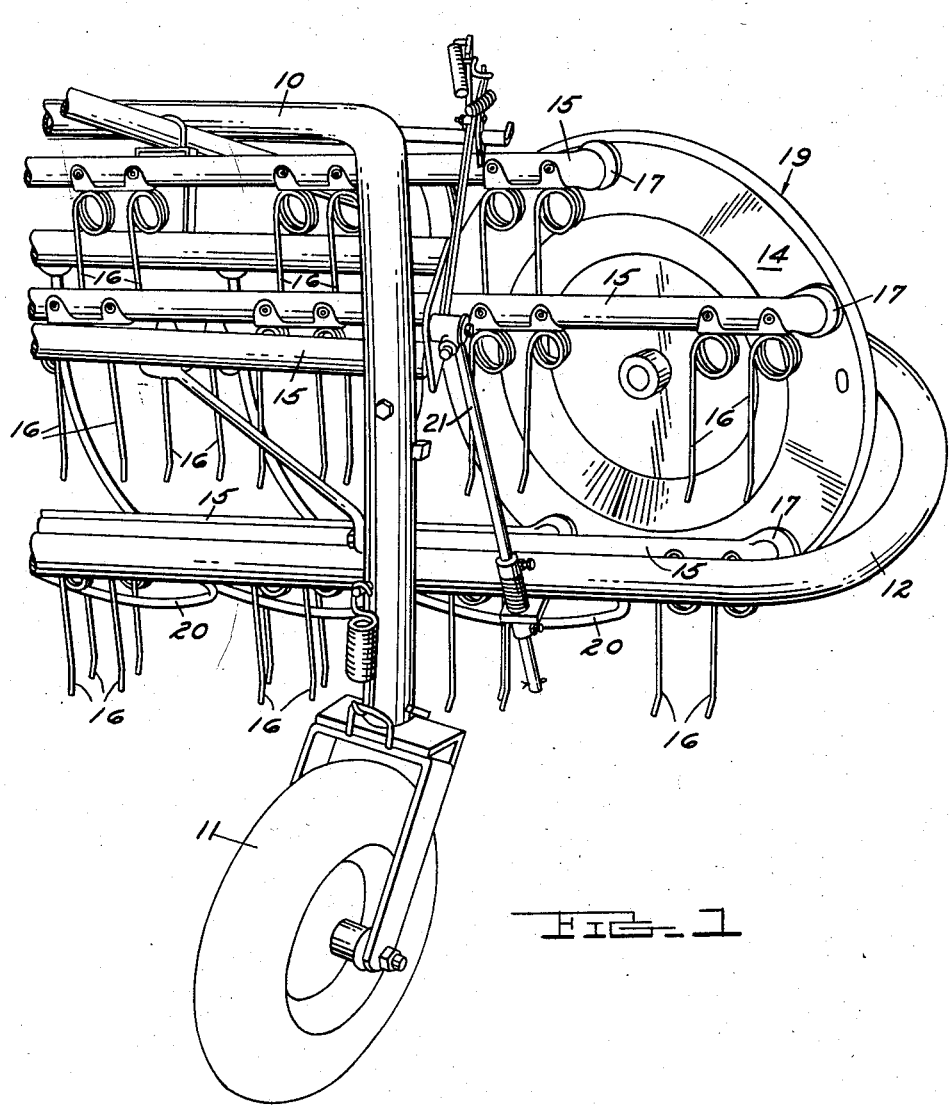
Figure 1 is a rear prospective view of the right hand end of a side delivery rake having a rake tooth bar construction according to the present invention.

Referring to Figure 1, the side delivery rake with which the rake bar assembly of the present invention is shown has a main frame 10 which is supported by two ground wheels, one ground wheel 11 being shown, and a tractor forming a third support during use of the rake. A reel frame 12 is supported from the main frame 10 and supports a pair of reel plates mounted for rotation on parallel axes extending generally in the direction of travel of the rake, the right hand reel plate 14 being shown. The reel plates, which are shown as circular but may be of polygonal outline or have a series of radial arms, are connected by a plurality of horizontally extending tooth bars 15 from which springy steel teeth 16 project downwardly at intervals. The tooth bars 15 are rotatably mounted on the reel plates 14 by bearings, not shown, received within bearing housings 17 fixed to the ends of the tooth bars.

The reel frame 12 is generally oval in form, surrounding the raking reel 19 formed by the reel plates 14 and tooth bars 15. A plurality of stripper bars 20 extend generally diagonally between the front and rear portions of the reel frame 12, the strippers defining generally a portion of a cylindrical surface through which the lower ends of the teeth 16 project when in the lower portion of their orbits or travel. The strippers serve to remove any crop that may tend to adhere to the teeth. A lift rod assembly 21, a portion of which is shown in Figure 1, serves to raise the entire assembly of reel frame 12 and raking reel 19 for transport.

Referring now to Figures 2 and 3, the tooth bars 15 each are formed of a length of pipe. The teeth 16, all of which are similar, are secured to the tooth bars 15 in a manner to be described.

Each tooth 16 is formed of a length of spring steel wire having a bight portion 24 at its upper end which is adapted to be secured against the front face of one of the tooth bars 15. The bight portion 24 extends vertically downward from the front side of the rake bar and merges with an intermediate circular coiled section 25 of the tooth which preferably consists of three complete turns of the wire, the adjacent turns touching. The coiled section 25 is immediately below the tooth bar 15, as indicated in Figure 3. A generally straight tine portion 26 projects downwardly from the coiled section 25 and terminates in a lower end portion 27 which may be angled slightly towards the direction of travel of the tooth during its raking movement. The teeth 16 preferably are formed of oil tempered spring steel wire which is stress-relieved after forming.

A tooth bracket 29, formed of sheet metal, is provided with a vertical portion 30 lying along the rear side of the tooth bar 15 opposite the bight portion 24 of each tooth. The bracket 29 follows generally the contour of the outside of the tooth bar, having a horizontal portion 31 interposed between the underside of the tooth bar and the top of the coiled section 25 of the tooth. Preferably, this portion of the bracket is in actual contact with the underside of the tooth bar 15 although the bracket preferably is not in continuous contact with the bar between its vertical and horizontal portions. The top of the coiled section 25 of the tooth is either in contact or substantially in contact with the horizontal portion of the bracket.

A forwardly, downwardly projecting ear portion 32 of the tooth bracket 29 is provided with a hole 34 for receiving the bight portion 24 of the tooth 16. Preferably, in forming the hole 34, the metal surrounding the hole is displaced downwardly to form an integral grommet 33 so as to provide a smooth, extended bearing between the bracket and tooth. The bracket engages the bight portion of the tooth substantially below the level of the underside of the tooth bar, and preferably generally at the level of the inside of the top of the coiled section 25, indicated by the line A of Figure 3, or lower.

The tooth 16 and bracket 29 are secured to the tooth bar 15 by a carriage bolt 35 and nut 36 received through a diametrically extending hole 37 in the tooth bar and clamping both the tooth 16 and the bracket 29 tightly against the tooth bar. If desired, a lock washer 38 may be placed under the nut. Preferably, the bracket 29 is extended, each bracket receiving a pair of teeth 16, 16 mounted on the tooth bar in the manner described, each bracket 29 being clamped by two spaced bolts 35 and, therefore, better held against movement on the tooth bar.

In use, the tine portion 26 of each tooth 16 is deflected generally in the direction of the arrow B indicated in Figure 2. As the teeth pass through the lower portion of their orbits of movement upon rotation of the raking reel 19, the bight portion 24 of each tooth is maintained firmly clamped against the front face of the tooth bar 15 and that part of the bight portion immediately above the point of tangency 38 of the bight portion with the coiled section is embraced by the ear portion 32 of the bracket 29, thus supporting the upper end portion of each tooth at two spaced points and reducing oscillation of that portion of the tooth above the coiled section 25. Inasmuch as the individual coils of the section 25 preferably are in actual contact and also contact the underside of the bracket 29, vibration of this portion of the tooth is inhibited. Therefore breakage of teeth due to fatigue of the metal after a period of use almost always will occur adjacent the point of tangency between the coiled section 25 and the tine portion 26. Accordingly, in most instances only the tine portion 26 will break off and be dropped in the field, the coiled section 25 and bight portion 24 of the tooth being retained.

The mounting of the bracket 29 on the tooth bar 15, the space between the surface of the tooth bar and the bracket between its vertical portion 30 and its horizontal portion 31 and the gauge of the sheet from which the bracket is formed (.075 inch) contribute to form a bracket in which the ear portion 32 of the bracket will yield slightly under load on the tooth 16, so as to reduce stress concentration on the tooth at the area of engagement of the ear with the tooth.

Deflection of the tine portion 26 to the right as positioned in Figure 2 will tend to tighten the coils of the coiled section 25 slightly and to force the top of the coil against the underside of the horizontal portion 31 of the bracket. Even though this portion is lubricated, wear of the bracket will take place. However, this portion of the bracket 29 will protect the underside of the tooth bar 15 against wear, thus preserving the original dimensions and strength of the tooth bar.

Inasmuch as the teeth 16 are not made in pairs, a tooth that breaks may be replaced individually and without disturbing the next adjacent tooth. A broken tooth 16 is replaced by removing the bolt 35 and nut 36 and disengaging the upper end of the tooth from the bracket 29. The upper end of the new tooth 16 is then engaged through the hole 34 in the bracket and the bolt 35 and nut 36 replaced and tightened to clamp the bracket 29 and tooth 16 against opposite sides of the tooth bar.

I claim:

1. A side delivery rake tooth bar assembly, comprising: a horizontally extending, straight tooth bar; a resilient tooth formed of a length of springy wire having a bight portion at its upper end secured adjacent one side of the tooth bar, an intermediate, circular coiled section closely below the underside of the tooth bar, and a downwardly extending tine portion; a tooth bracket positioned against the opposite side of the tooth bar, interposed between the underside of the tooth bar and the coiled section of the tooth, and having a portion receiving the tooth generally at the level of the inside of the top of the coiled section to stabilize the tooth and prevent fatigue fracture of the section of the tooth above the coiled section.

2. A side delivery rake tooth bar assembly, comprising: a horizontally extending tooth bar of circular cross section; a resilient tooth formed of a length of springy wire having a bight portion at its upper end secured against the front side of the tooth bar, an intermediate circular coil section closely below the underside of the tooth bar, and a downwardly extending tine portion; a stamped sheet metal tooth bracket positioned against the back side of the tooth bar, having a portion extending beneath the tooth bar and interposed between the bar and the coiled section of the tooth and terminating in a forward portion closely surrounding the bight portion of the tooth below the bottom of the tooth bar to stabilize the tooth and prevent fatigue fraction of the tooth above the coiled section; and a threaded fastener extending through the tooth bar and clamping both the bight portion of the tooth and the bracket against the tooth bar.

3. A tooth bar assembly as claimed in claim 2, in which the forward portion of the bracket is downwardly inclined and is provided with a hole receiving the tooth, the metal surrounding the hole being displaced downwardly to form an integral grommet.

4. A side delivery rake tooth bar assembly, comprising: a horizontally extending, straight tooth bar; a resilient tooth formed of a length of springy wire having a bight portion at its upper end, an intermediate circular coiled section closely below the underside of the tooth bar, and a downwardly extending tine portion; a tooth bracket positioned against the opposite side of the tooth bar, interposed between the underside of the tooth bar and the coiled section of the tooth, and having a portion receiving the tooth generally at the level of the inside of the top of the coiled section to stabilize the tooth and prevent fatigue fracture of the section of the tooth above the coiled section; and a threaded fastener extending through the tooth bar and clamping both the bight portion of the tooth and the bracket against the tooth bar.

5. A side delivery rake tooth bar assembly, comprising: a horizontally extending, straight tooth bar; a pair of resilient teeth, each tooth being formed of a length of springy wire having a bight portion at its upper end secured adjacent one side of the tooth bar, an intermediate, circular coiled section closely below the underside of the tooth bar, and a downwardly extending tine portion; a tooth bracket positioned against the opposite side of the tooth bar, interposed between the underside of the tooth bar and the coiled section of each tooth, and having a pair of portions spaced along the length of the tooth bar and receiving the teeth generally at the level of the inside of the top of the coiled section to stabilize the teeth and prevent fatigue fracture of the section of the teeth above the coiled section.

6. A side delivery rake tooth bar assembly, comprising: a horizontally extending tooth bar of circular cross-section; a resilient tooth formed of a length of springy wire having a bight portion at its upper end secured against the front side of the tooth bar, an intermediate circular coiled section closely below the underside of the tooth bar, and a downwardly extending tine portion; a stamped sheet metal tooth bracket positioned against the back side of the tooth bar, having a portion extending beneath the tooth bar and terminating in a forward position closely surrounding the bight portion of the tooth below the bottom of the tooth bar to stabilize the tooth and prevent fatigue fracture of the tooth above the coiled section; and a threaded fastener extending through the tooth bar, the bight portion of the tooth and the bracket and clamping both the bight portion of the tooth and the bracket against the tooth bar.

7. A rake tooth bar assembly as claimed in claim 6, in which the circular coiled section of the tooth comprises a plurality of coils side-by-side with adjacent coils touching and lying generally in a plane making an acute angle with the length of the tooth bar, the coils lying to the rear of the bight section and the tine portion of the tooth extending downwardly from the rearmost coil.

References Cited in the file of this patent

UNITED STATES PATENTS

| | | |
|---|---|---|
| 442,794 | Brinkerhoff | Dec. 16, 1890 |
| 2,171,025 | Crumb et al. | Aug. 29, 1939 |
| 2,719,401 | Erickson et al. | Oct. 4, 1955 |
| 2,732,678 | Blaser et al. | Jan. 31, 1956 |